United States Patent [19]
Ritter

[11] Patent Number: 5,140,112
[45] Date of Patent: Aug. 18, 1992

[54] SWITCH FOR A CONVERTIBLE TOP CONTROL

[75] Inventor: Bernhard Ritter, Pforzheim, Fed. Rep. of Germany

[73] Assignee: Dr. Ing. h.c.F. Porsche AG, Fed. Rep. of Germany

[21] Appl. No.: 642,426

[22] Filed: Jan. 17, 1991

[30] Foreign Application Priority Data

Jan. 19, 1990 [DE] Fed. Rep. of Germany ....... 4001440

[51] Int. Cl.⁵ .............................................. H01H 9/06
[52] U.S. Cl. ........................... 200/61.58 R; 200/61.85; 200/61.87
[58] Field of Search ........... 200/52 R, 61.58 R, 61.85, 200/61.87, 61.88, 61.89, 61.9; 307/10.4

[56] References Cited

U.S. PATENT DOCUMENTS

| | | | |
|---|---|---|---|
| 4,360,718 | 11/1982 | Schobinger et al. | 200/61.88 |
| 4,482,885 | 11/1984 | Mochida | 200/61.88 X |
| 4,574,651 | 3/1986 | Nordstrom | 200/61.85 X |
| 4,644,235 | 2/1987 | Ohta | 318/282 |
| 4,749,193 | 6/1988 | Hacker | 307/10.4 X |

FOREIGN PATENT DOCUMENTS 3413380 10/1985 Fed. Rep. of Germany .
61-81223 4/1986 Japan .

OTHER PUBLICATIONS

One-Page German Office Action; Aug. 1990.
"Der neue Mercedes-Benz Roadster Karosserie, Verdeck und Schliessung", in De-Z.: Automobiltech-Nische Zeitschrift 91 (1989) 6, Seite 309-318.

Primary Examiner—J. R. Scott
Attorney, Agent, or Firm—Evenson, Wands, Edwards, Lenahan & McKeown

[57] ABSTRACT

Switching apparatus including a switch is used for the control of a power-assisted convertible top of a motor vehicle which can be swivelled from a closed position into an opened position. For reasons of safety, the switch is disposed so that it can be used only when the motor vehicle is not moving. In preferred embodiments, the switch is disposed in a recess which is accessible only when a vehicle brake lever is in a brake engaged position.

9 Claims, 1 Drawing Sheet

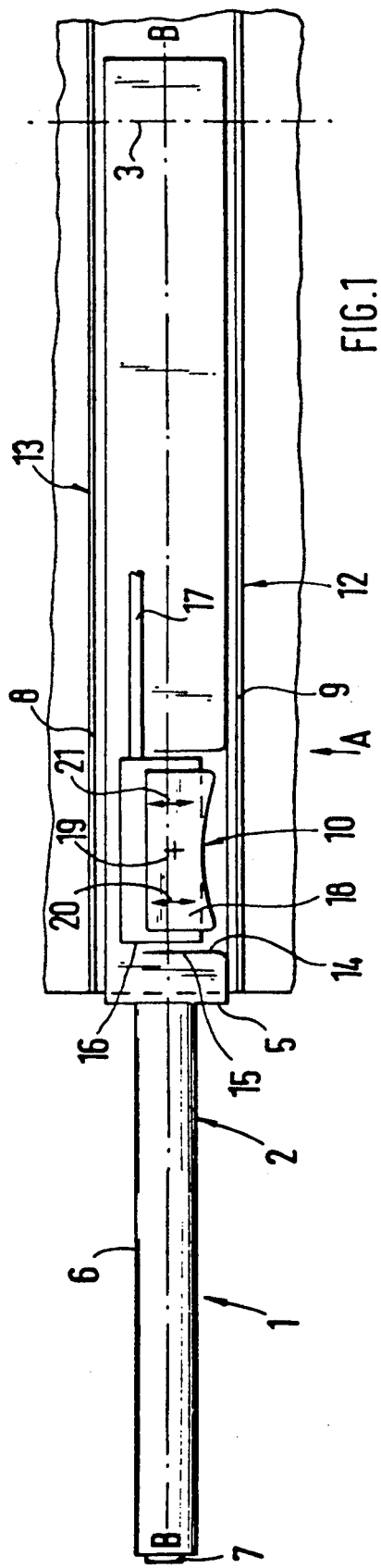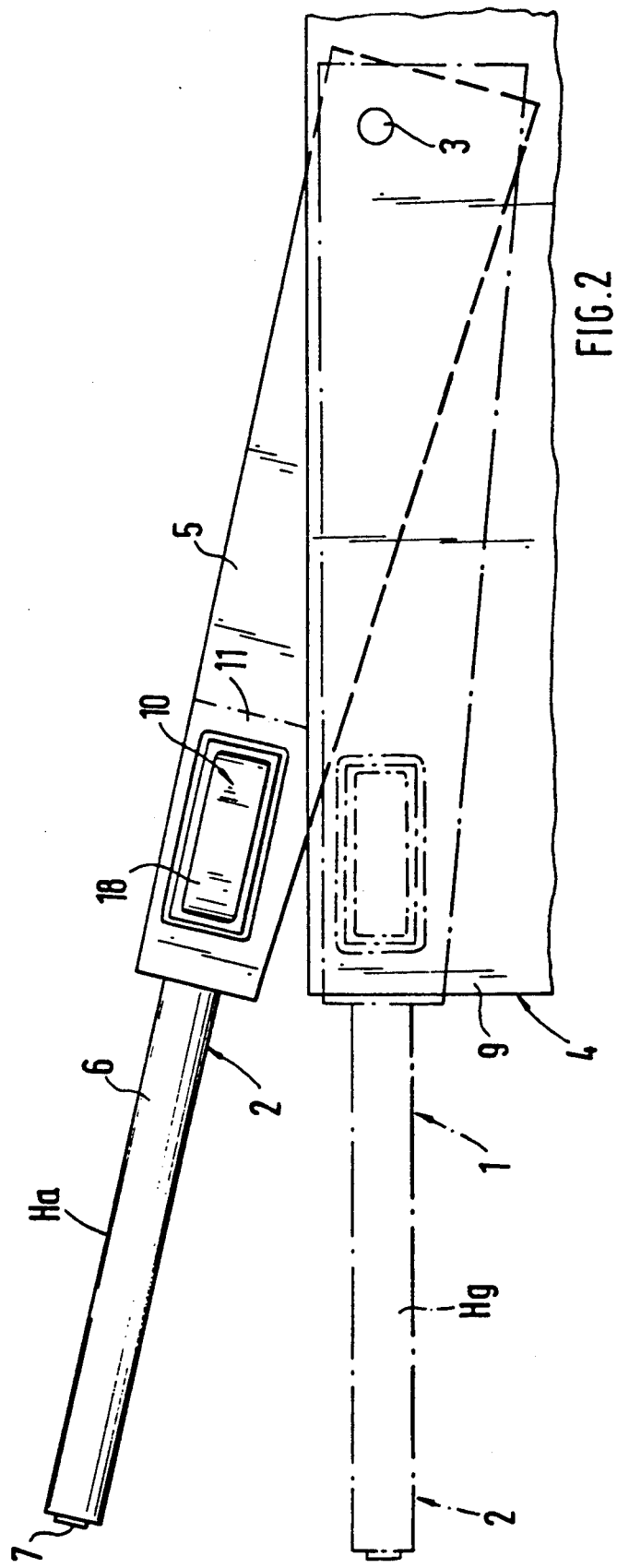

SWITCH FOR A CONVERTIBLE TOP CONTROL

BACKGROUND AND SUMMARY OF THE INVENTION

The invention relates to a switch for the control of a power-assisted convertible top of a motor vehicle which can be moved from a closed position to an opened position.

In the German Patent Document DE-OS 34 13 380, a manual operating switch for a convertible top of a motor vehicle is described which is provided on a dashboard.

It is an object of the invention to arrange and construct a switch for the control of a convertible top of a motor vehicle so that the switch is safe with respect to the driving operation and with respect to the operation of the top.

According to the invention, this object is achieved by an arrangement in which operation of the control switch is possible only when the motor vehicle is not moving. In especially preferred embodiments, the switch for operating the convertible top is operatively coupled to a vehicle hand brake so as to prevent convertible top operation when the hand brake is released.

Principal advantages achieved by the invention are that operation of the switch, and therefore an actuation of the convertible top, is impossible when the hand brake is released and the vehicle is therefore in motion. A closing and opening of the top during the drive would not only draw the driver's attention away from observing the general traffic situation, but the top would also be subjected to uncontrolled air currents caused by the air stream which may damage the top.

Other objects, advantages and novel features of the present invention will become apparent from the following detailed description of the invention when considered in conjunction with the accompanying drawings.

BRIEF DESCRIPTION OF THE DRAWINGS

FIG. 1 is a top view of a hand brake lever with the convertible top control switch constructed according to a preferred embodiment of the invention; and FIG. 2 is a view in the direction of the arrow A of FIG. 1.

DETAILED DESCRIPTION OF THE DRAWINGS

A hand brake 1 is arranged in the area of a transmission tunnel of a motor vehicle (not shown) having a convertible top. A central longitudinal axis B—B of the hand brake 1 is aligned in the longitudinal direction of the vehicle. The hand brake 1 comprises a stick control part 2 which is hinged at reference number 3, specifically in a housing 4 which is, for example, U-shaped in its cross-section. The control part 2 is formed by a carrier 5 and a tube-shaped gripping handle 6, at the free end of which a release button 7 is mounted.

In the released position Hg of the hand brake 1, the control part 2 is disposed in the housing 4; that is, upright walls 8, 9 of the housing 4 form a local covering for the control part 2 in the area of the carrier 5. In contrast, in the engaged position Ha of the hand brake 1, the control part 2 with its carrier 5, extends at least part way out of the covering or the housing 4.

The convertible top (not shown) is moved by means of a power-assisted device, such as an electric motor, from a closed position into an open position, and vice versa. The electric motor is controlled by means of a switch 10 which can be operated only if the vehicle is not moving. For this purpose, switch 10 is arranged on the control part 2, specifically in a zone 11 which, in the engaged position Ha of the hand brake, extends out of the covering formed by the walls 8, 9. In other words, the switch 10 is accessible only in position Ha of the hand brake 1, in which the vehicle is secured in an immobile position. In the embodiment shown, the switch 10 is mounted on an upright wall of the control part 2 on the side 12 facing the driver. Other preferred embodiments are contemplated where the switch 10 is provided on the side 13 facing away from the driver.

For receiving of the switch 10, a recess 14 is provided at the control part 2 or at the carrier 5 which, by means of a flange 15, surrounds a switch housing 16. Switch housing 16 is connected with an electric cable 17 which is connected to an electric motor for controlling a convertible top operating mechanism.

The switch is a rocker switch, the rocker 18 of which can be swivelled at reference number 19 in such a manner that it can be adjusted according to arrows 20 and 21.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Apparatus for controlling operation of a power-assisted convertible top of a motor vehicle which can be moved between a closed position and an opened position, said apparatus comprising:
   manually actuatable switch means for causing said power assisted convertible top to move between said open and closed positions; and
   means for preventing actuation of said switching means when said vehicle is in motion.

2. Apparatus according to claim 1, wherein said switch means is arranged on a hand brake in such a manner that it is accessible only when the hand brake is engaged.

3. Apparatus according to claim 2, wherein said switch means is mounted on a control stick part of the hand brake, the switch being disposed in a zone of the control stick part which projects out of a covering housing only when the hand brake is engaged.

4. Apparatus according to claim 3, wherein said switch means is a rocker switch which, is disposed at least in part in a recess in the control stick part.

5. Apparatus according to claim 3, wherein said switch means is mounted on a side of the control stick part facing the driver of the vehicle.

6. Apparatus according to claim 3, wherein said switch means is mounted on a side of the stick part facing away from the driver of the vehicle.

7. Apparatus according to claim 4, wherein said switch means is mounted on a side of the control stick part facing the driver of the vehicle.

8. Apparatus according to claim 4, wherein said switch means is mounted on a side of the stick part facing away from the driver of the vehicle.

9. Apparatus according to claim 1, wherein said means for preventing actuation comprises means for blocking physical access to said switch means when said vehicle is in motion.

* * * * *